United States Patent
Tateda et al.

(10) Patent No.: US 10,050,357 B2
(45) Date of Patent: Aug. 14, 2018

(54) CONNECTION MEMBER AND MOTOR DRIVE DEVICE HAVING THE SAME

(71) Applicant: FANUC CORPORATION, Yamanashi (JP)

(72) Inventors: Masaya Tateda, Yamanashi (JP); Yuuta Satou, Yamanashi (JP); Kaname Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/807,031

(22) Filed: Nov. 8, 2017

(65) Prior Publication Data
US 2018/0138608 A1  May 17, 2018

(30) Foreign Application Priority Data
Nov. 16, 2016 (JP) ................... 2016-223380

(51) Int. Cl.
| H01R 31/08 | (2006.01) |
| H01R 11/01 | (2006.01) |
| H02P 5/00 | (2016.01) |
| H01R 11/09 | (2006.01) |

(52) U.S. Cl.
CPC ............. *H01R 11/01* (2013.01); *H01R 11/09* (2013.01); *H02P 5/00* (2013.01); *H02P 2201/13* (2013.01)

(58) Field of Classification Search
CPC ...... H01R 11/01; H01R 11/09; H01R 9/2675; H02P 5/00; H01H 9/0271
See application file for complete search history.

(56) References Cited

U.S. PATENT DOCUMENTS

| 6,392,319 | B1 * | 5/2002 | Zebermann | H01R 9/2675 307/147 |
| 6,396,889 | B1 * | 5/2002 | Sunter et al. | H01H 9/0271 439/715 |
| 7,666,005 | B2 * | 2/2010 | Haggeman et al. | H01R 12/00 439/76.1 |
| 8,531,820 | B2 * | 9/2013 | Barnas et al. | H03B 1/26 361/634 |
| 8,986,033 | B2 * | 3/2015 | Berger et al. | H01R 9/26 361/622 |
| 9,113,572 | B2 * | 8/2015 | Li et al. | 174/260 |
| 9,484,742 | B2 * | 11/2016 | Skalterud | H03J 1/10 439/715 |
| 9,576,762 | B2 * | 2/2017 | Chen et al. | |

FOREIGN PATENT DOCUMENTS

| JP | S62-41673 U | 3/1987 |
| JP | 2009-225497 A | 10/2009 |
| JP | 2012-182051 A | 9/2012 |

* cited by examiner

*Primary Examiner* — Jean F Duverne
(74) *Attorney, Agent, or Firm* — Maier & Maier, PLLC (57) ABSTRACT

A connection member includes: a first short bar whose one end is attached to a first terminal block; a second short bar which extends in a longitudinal direction of the first short bar and whose one end is attached to a second terminal block, at least part of the other end of the second short bar overlapping the first short bar; and a guide member which is attached to an overlapping part of the first short bar and the second short bar and which allows the second short bar to move relative to the first short bar in the longitudinal direction while maintaining surface contact between the first short bar and the second short bar at the overlapping part.

4 Claims, 6 Drawing Sheets

CONNECTION MEMBER AND MOTOR DRIVE DEVICE HAVING THE SAME

CROSS-REFERENCE TO RELATED APPLICATIONS

This application is based on and claims priority to Japanese Patent Application No. 2016-223380 filed on Nov. 16, 2016, the entire content of which is incorporated herein by reference.

TECHNICAL FIELD

The present invention relates to a connection member and a motor drive device including the same, and particularly relates to a motor drive device including a plurality of motor driving units connected with each other through connection members.

BACKGROUND ART

Figure 6:
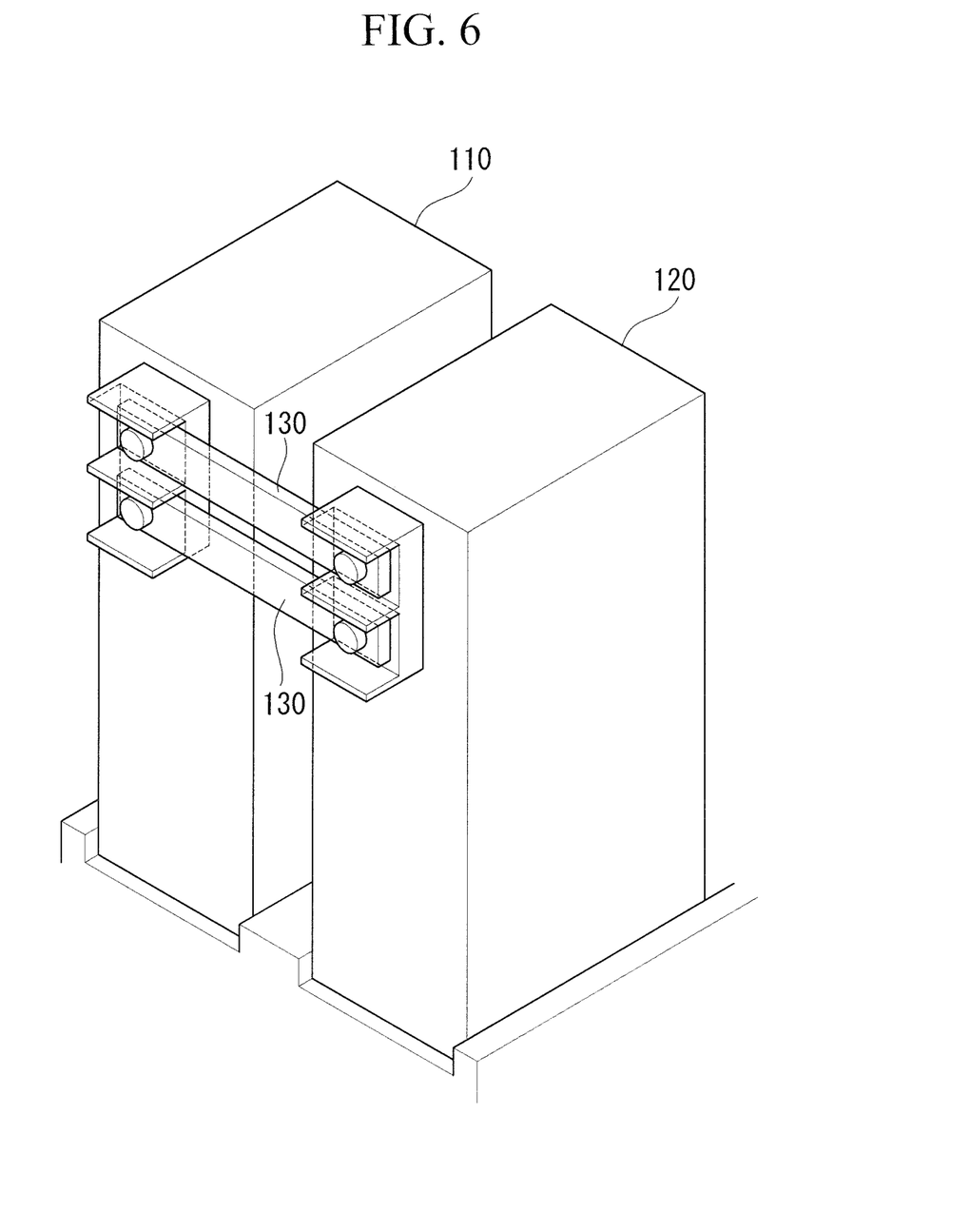
FIG. 6 is an essential part perspective view schematically illustrating a conventional motor drive device.

As illustrated in FIG. 6, a known motor drive device (refer to PTL 1, for example) includes a first motor driving unit 110 that functions as a converter, and a second motor driving unit 120 that functions as an inverter. The first motor driving unit 110 and the second motor driving unit 120 are connected with each other through a pair of short bars 130.

A known connection member includes a bus bar of one side including two elongated plate members disposed with an interval therebetween in the thickness direction, a bus bar of the other side which is formed in an elongated plate shape and which is inserted between the two plate members of the bus bar of the one side, and a long hole formed in the bus bar of the other side and extending in a longitudinal direction thereof, and a bolt inserted into the long hole of the bus bar of the other side through the two plate members of the one bus bar in the thickness direction (refer to PTL 2, for example). When the bolt is loosened in this connection member, the bus bar of the other side can be moved relative to the bus bar of the other side in the longitudinal direction to adjust the length of the connection member.

In a known plate bus bar having one end that is connected with a terminal block of an inverter circuit and the other end that is connected with a terminal block of a motor or an electric generator, a plurality of grooves extending in a direction orthogonal to the longitudinal direction of the bus bar are provided at a central part of the bus bar in the longitudinal direction to improve the bending flexibility in the thickness direction and heat-releasing performance when the bus bar has a large plate thickness (refer to PTL 3, for example).

When this bus bar is used, a stud bolt provided on the terminal block of the inverter circuit is inserted into a through-hole provided in the one end of the bus bar, and another stud bolt provided on the terminal block of the motor or the electric generator is inserted into a through-hole provided in the other end of the bus bar. Then, the stud bolts are screwed with nuts to fix the ends of the bus bar. Since the central part of the bus bar is easy to bend because of the grooves, one end of the bus bar can be removed from the corresponding stud bolt by bending the bus bar in the thickness direction at the central part after removing the nut of the stud bolt while the other stud bolt is screwed with the nut.

CITATION LIST

Patent Literature

{PTL 1}
 Japanese Unexamined Patent Application, Publication No. 2009-225497
{PTL 2}
 Japanese Unexamined Utility Model Application, Publication No. S62-41673
{PTL 3}
 Japanese Unexamined Patent Application, Publication No. 2012-182051

SUMMARY OF INVENTION

A connection member according to a first aspect of the present invention includes: a first short bar whose one end is configured to be attached to a first terminal block; a second short bar which is extending in a longitudinal direction of the first short bar and whose one end is configured to be attached to a second terminal block, at least part of the other end side of the second short bar overlapping the first short bar in a direction orthogonal to the longitudinal direction; and a guide member which is attached to an overlapping part of the first short bar and the second short bar and which allows the second short bar to move relative to the first short bar in the longitudinal direction while maintaining surface contact between the first short bar and the second short bar at the overlapping part.

DESCRIPTION OF EMBODIMENTS

A motor drive device according to an embodiment of the present invention will be described below with reference to the accompanying drawings.

Figure 1:
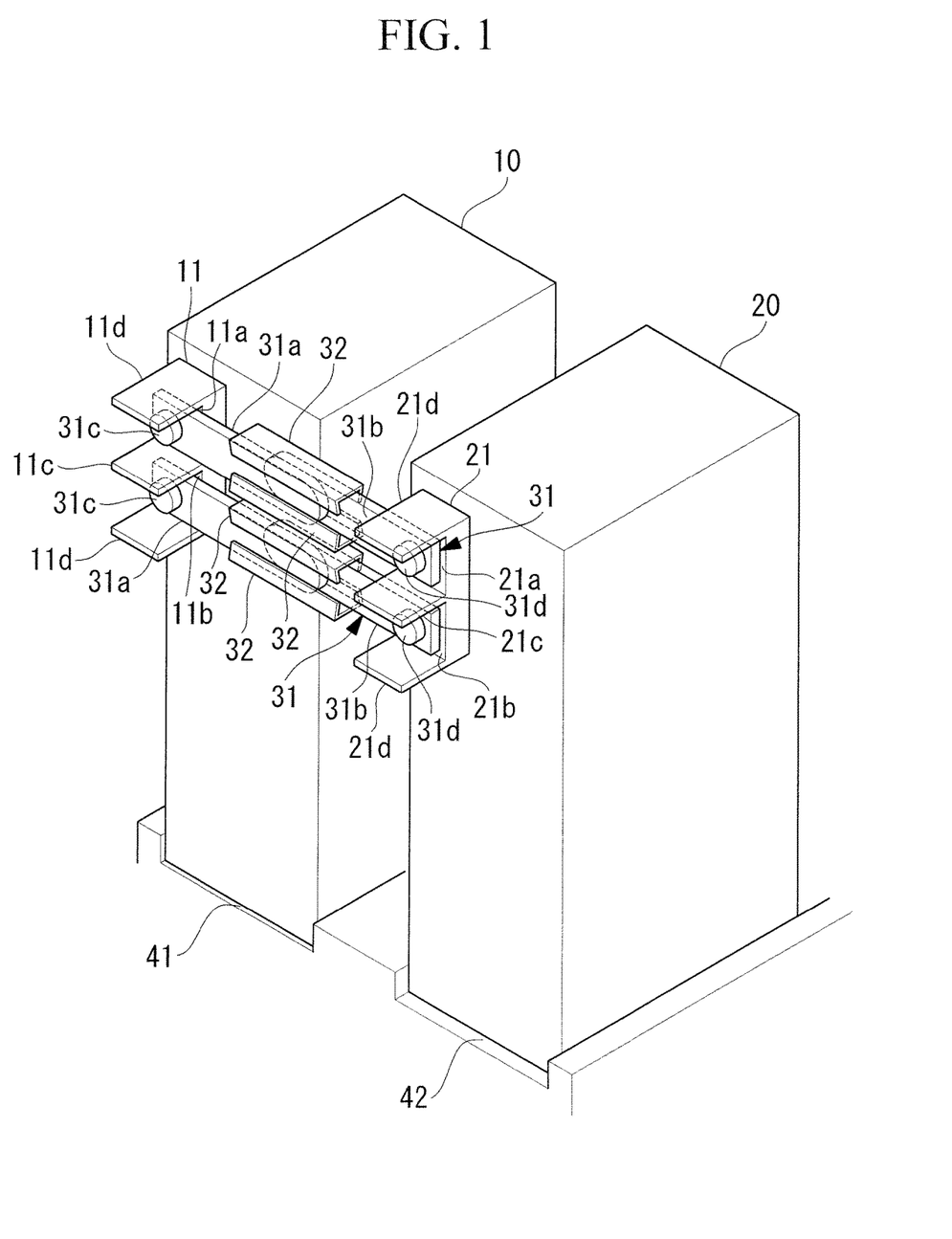
FIG. 1 is an essential part perspective view schematically illustrating a motor drive device according to an embodiment of the present invention.
Figure 2:
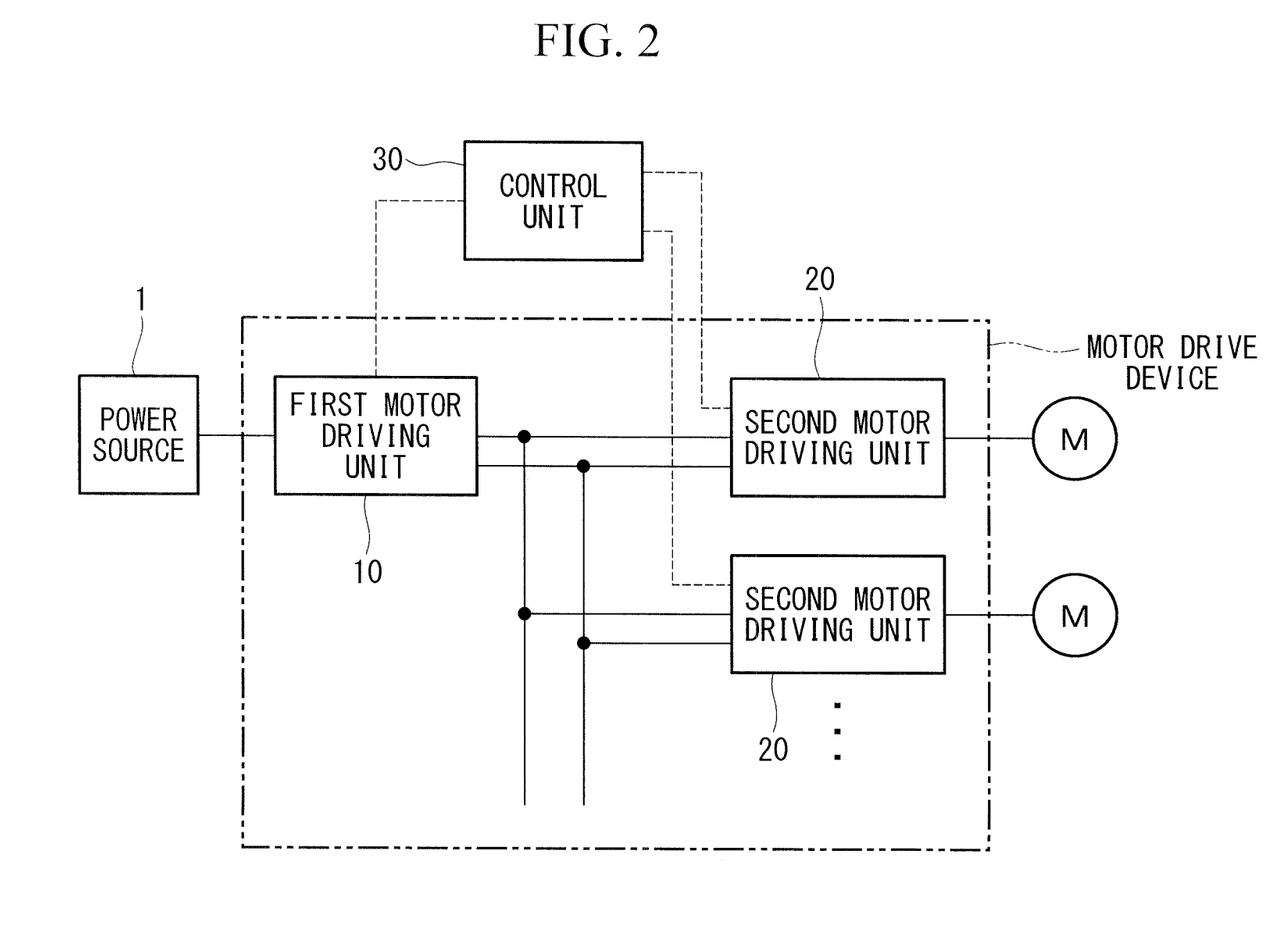
FIG. 2 is a schematic block diagram of the motor drive device according to the present embodiment.

As illustrated in FIGS. 1 and 2, this motor drive device includes a first motor driving unit (converter) 10 configured to convert alternating-current power supplied from a power source 1 into direct-current power, and at least one second motor driving unit (inverter) 20 connected with the first motor driving unit 10 through a pair of connection members 31 and configured to convert the direct-current power supplied from the first motor driving unit 10 into alternating-current power and supply the alternating-current power to a motor M such as a servomotor. The motor M is provided in, for example, a robot, a machining tool, or an industrial machine. The above-described motor drive device is controlled by a control unit 30. In order to simplify the following description, a case in which only one second motor driving unit is provided will be explained below.

The first motor driving unit 10 has, for example, a direct-current conversion circuit housed in a rectangular housing and configured to convert alternating-current power into direct-current power. The second motor driving unit 20 has, for example, an alternating-current conversion circuit housed in a rectangular housing and configured to convert the direct-current power from the first motor driving unit 10 into alternating-current power having characteristics in accordance with a control signal from the control unit 30 and supply this alternating-current power to the motor M.

The control unit 30 includes a CPU, a storage device such as a RAM, a ROM, and the like, and an input unit, and operates based on a control program stored in the storage device to transmit control signals to the first and second motor driving units 10 and 20. Accordingly, the motor M operates based on the control program.

The first motor driving unit 10 is housed in a first housing portion 41 provided inside the motor drive device, and the second motor driving unit 20 is housed in a second housing portion 42 provided inside the motor drive device.

The first motor driving unit 10 is inserted into the first housing portion 41 from a front side toward a back side to be housed in the first housing portion 41. The second motor driving unit 20 is inserted into the second housing portion 42 from the front side toward the back side to be housed in the second housing portion 42.

The first motor driving unit 10 includes a first terminal block 11, and the second motor driving unit 20 includes a second terminal block 21. The terminal blocks 11 and 21 are fixed to front surfaces (surfaces on the front side) of the motor driving units 10 and 20, respectively.

The front surfaces (surfaces on the front side) of the terminal blocks 11, 12 are each provided with a first connection surface 11a, 21b, a second connection surface 11b, 21b, a central partition 11c, 21c, and end-side partitions 11d, 21d. The first connection surfaces 11a, 21a are connected with either of the connection members 31. The second connection surfaces 11b, 21b are each connected with the other connection member 31. The central partitions 11c, 21c are disposed between the first connection surfaces 11a, 21a and the second connection surfaces 11b, 21b, and protrude toward the front side relative to the first connection surfaces 11a, 21a and the second connection surfaces 11b, 21b. The end-side partitions 11d, 21d protrude toward the front side like the central partitions 11c, 21c. At least the central partitions 11c and 21c are made of an insulator.

Each connection member 31 includes a first short bar 31a which is a metal plate member, a second short bar 31b which is a metal plate member, and a pair of guide members 32. One end of the first short bar 31a is configured to be attached to the first terminal block 11. The second short bar 31b is arranged to extend in a longitudinal direction of the first short bar 31a, and one end thereof is configured to be attached to the second terminal block 21 while the other end thereof overlaps the first short bar 31a in the thickness direction.

A through-hole is formed at one end of each of the first short bars 31a and penetrates the first short bar 31a in the thickness direction thereof. Fastening members 31c each having a male screw part are inserted into these through-holes. The male screw parts of the fastening members 31c are screwed into female screw holes provided in the first and second connection surfaces 11a and 11b of the first terminal block 11. In this manner, one ends of the paired connection members are attached to the corresponding one of the connection surfaces 11a and 11b as illustrated in FIG. 1.

A through-hole is formed at one end of each of the second short bars 31b and penetrates the second short bar 31b in the thickness direction thereof. Fastening members 31d each having a male screw part are inserted into these through-holes. The male screw parts of the fastening members 31d are screwed into female screw holes provided in the first and second connection surfaces 21a and 21b of the second terminal block 21. In this manner, the other ends of the paired connection members are attached to the corresponding one of the connection surfaces 21a and 21b as illustrated in FIG. 1.

Figure 4:
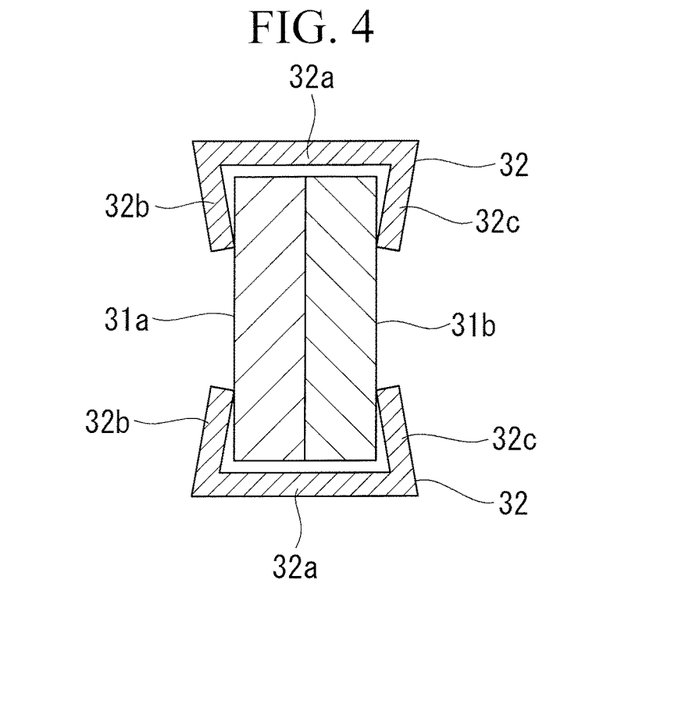
FIG. 4 is a cross-sectional view of a connection member according to the present embodiment.

As illustrated in FIG. 4, each guide member 32 includes a base part 32a, a first extension part 32b, and a second extension part 32c. The base part 32a extends in a thickness direction of the connection member (in the thickness direction of the short bars 31a and 31b) at an width-direction end of the overlapping portion of the connection member where the first short bar 31a and the second short bar 31b overlap each other. The first extension part 32b extends from one end of the base part 32a in the thickness direction toward the center of the connection member in the width direction and has contact with the first short bar 31a in the thickness direction. The second extension part 32c extends from the other end of the base part 32a in the thickness direction toward the center of the connection member in the width direction and has contact with the second short bar 31b in the thickness direction. The guide member 32 extends in the longitudinal direction of the connection member, and one end and the other end thereof in the longitudinal direction may be disposed at a position where the first short bar 31a and the second short bar 31b do not overlap each other.

The guide member 32 is made of, for example, metal, plastic, or the like, and can elastically deform in the thickness direction. The first extension part 32b comes into contact with the first short bar 31a in the thickness direction and the second extension part 32c comes into contact with the second short bar 31b in the thickness direction in a state in which the guide member 32 is elastically deforming such that the first extension part 32b and the second extension part 32c are farther away from each other. Restoring force against the elastic deformation maintains the first short bar 31a and the second short bar 31b in contact with each other in the thickness direction.

The guide member 32 maintains the first short bar 31a and the second short bar 31b in contact with each other in the thickness direction with such a force that the second short bar 31b is movable relative to the first short bar 31a in the longitudinal direction of the connection member.

According to the present embodiment, the first motor driving unit 10 and the second motor driving unit 20 are connected with each other by attaching one end of each first short bar 31a to the first terminal block 11 with the fastening member 31c, and by moving each second short bar 31b in a direction distant from the corresponding first short bar 31a to extend the connection member, and then by attaching one end of the second short bar 31*b* to the second terminal block 21 with the fastening member 31*d*. This configuration allows large current supply from the first motor driving unit 10 to the second motor driving unit 20.

Figure 3:
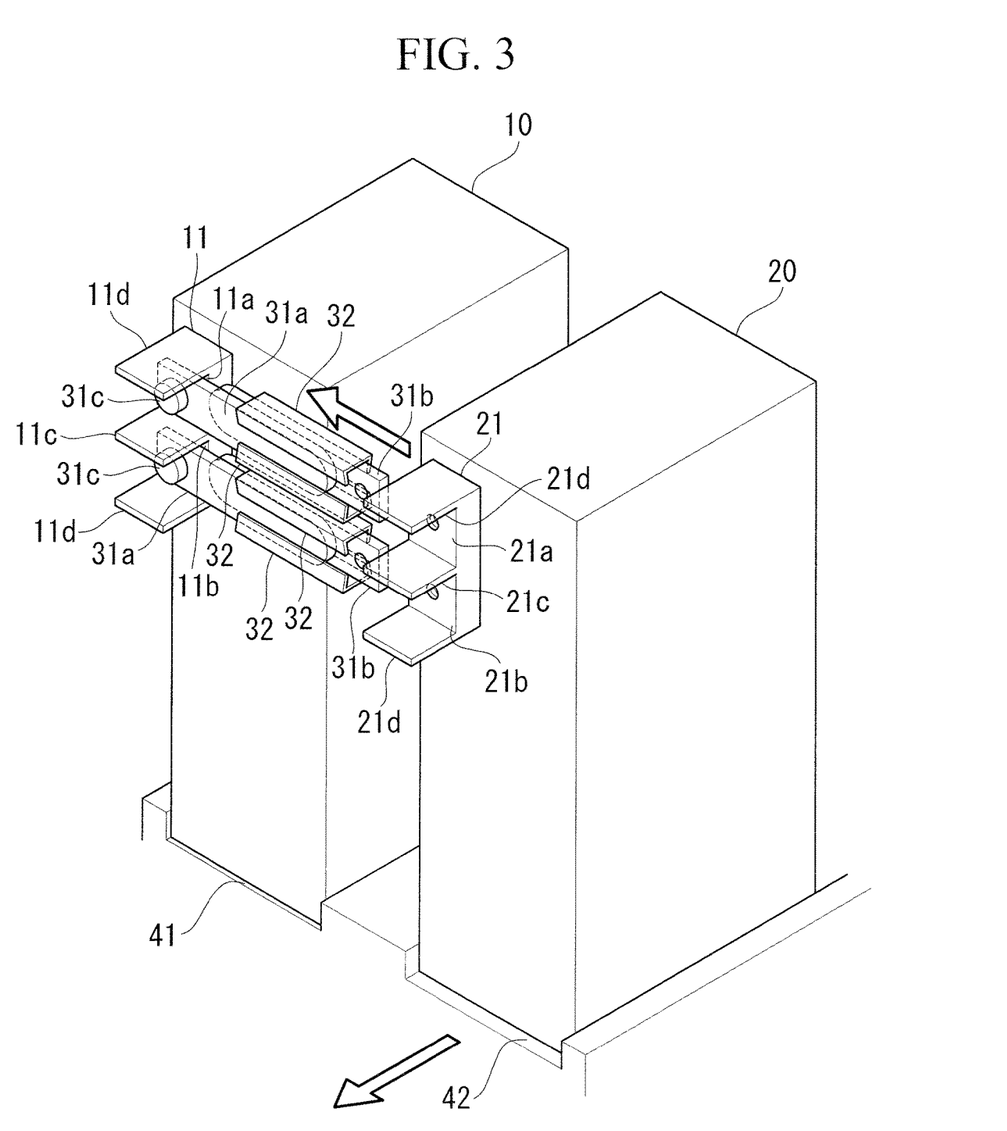
FIG. 3 is a diagram for explaining operation when replacing a second motor driving unit of the motor drive device according to the present embodiment.

Then, in order to move the second motor driving unit 20 toward the front side for replacement, one end of each second short bar 31*b* is detached from the second terminal block 21, and the second short bar 31*b* is moved toward the corresponding first short bar 31*a* as illustrated in FIG. 3. In this state, when the second short bar 31*b* is moved to a position at which the second short bar 31*b* does not overlap the second motor driving unit 20 in a front-back direction, the second motor driving unit 20 can be moved toward the front side and replaced without removing the connection members from the first terminal block 11.

The contacting state of the first short bar 31*a* and the second short bar 31*b* is reliably maintained by the restoring force of the elastic deformation of each guide member 32. Therefore, the contact of the first short bar 31*a* and the second short bar 31*b* is reliably maintained. The contacting state refers to a state in which the first short bar 31*a* and the second short bar 31*b* overlap each other in the thickness direction in a state (range) without a hole or the like and contact with each other across the entire contact surface.

Figure 5:
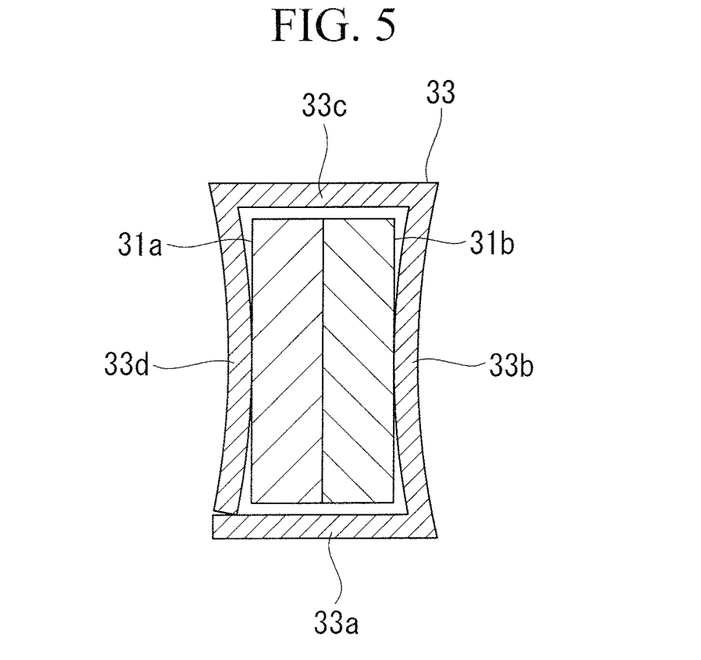
FIG. 5 is a cross-sectional view of a connection member according to a modification of the present embodiment.

Although the pair of guide members 32 covering edge parts of the first short bar 31*a* and the second short bar 31*b* are employed in the present embodiment, a guide member 33 covering entire circumference of the first short bar 31*a* and the second short bar 31*b* may be employed as illustrated in FIG. 5.

The guide member 33 illustrated in FIG. 5 includes a base part 33*a*, a first contact part 33*b*, a connection part 33*c*, and a second contact part 33*d*. The base part 33*a* extends in the thickness direction of the corresponding connection member. The first contact part 33*b* extends in the width direction of the connection member from one end of the base part 33*a* in the thickness direction. The connection part 33*c* extends in the thickness direction from an edge of the first contact part 33*b* in the width direction. The second contact part 33*d* extends in the width direction from an edge of the connection part 33*c* in the thickness direction toward the other end of the base part 33*a* in the thickness direction. The guide member 33 extends in the longitudinal direction of the connection member.

The guide member 33 is made of, for example, metal, plastic, or the like, and can elastically deform in the thickness direction. When the guide member 33 elastically deforms such that the first contact part 33*b* and the second contact part 33*d* are farther separated from each other, The first contact part 33*b* comes into contact with the first short bar 31*a* in the thickness direction and the second contact part 33*d* comes into contact with the second short bar 31*b* in the thickness direction in a state in which the guide member 33 is elastically deforming such that the first contact part 33*b* and the second contact part 33*d* are farther apart from each other. Restoring force against the elastic deformation maintains the first short bar 31*a* and the second short bar 31*b* in contact with each other in the thickness direction.

In the present embodiment, the first motor driving unit 10 is a converter and the second motor driving unit 20 is an inverter. However, when the first motor driving unit 10 is an inverter and the second motor driving unit 20 is a converter, one end of each first short bar 31*a* may be attached to the first terminal block 11 of the first motor driving unit 10, and one end of each second short bar 31*b* may be attached to the second terminal block 21 of the second motor driving unit 20.

In addition, the first motor driving unit 10 and the second motor driving unit 20 may be any unit for driving a motor, other than an inverter and a converter.

Figure 7:
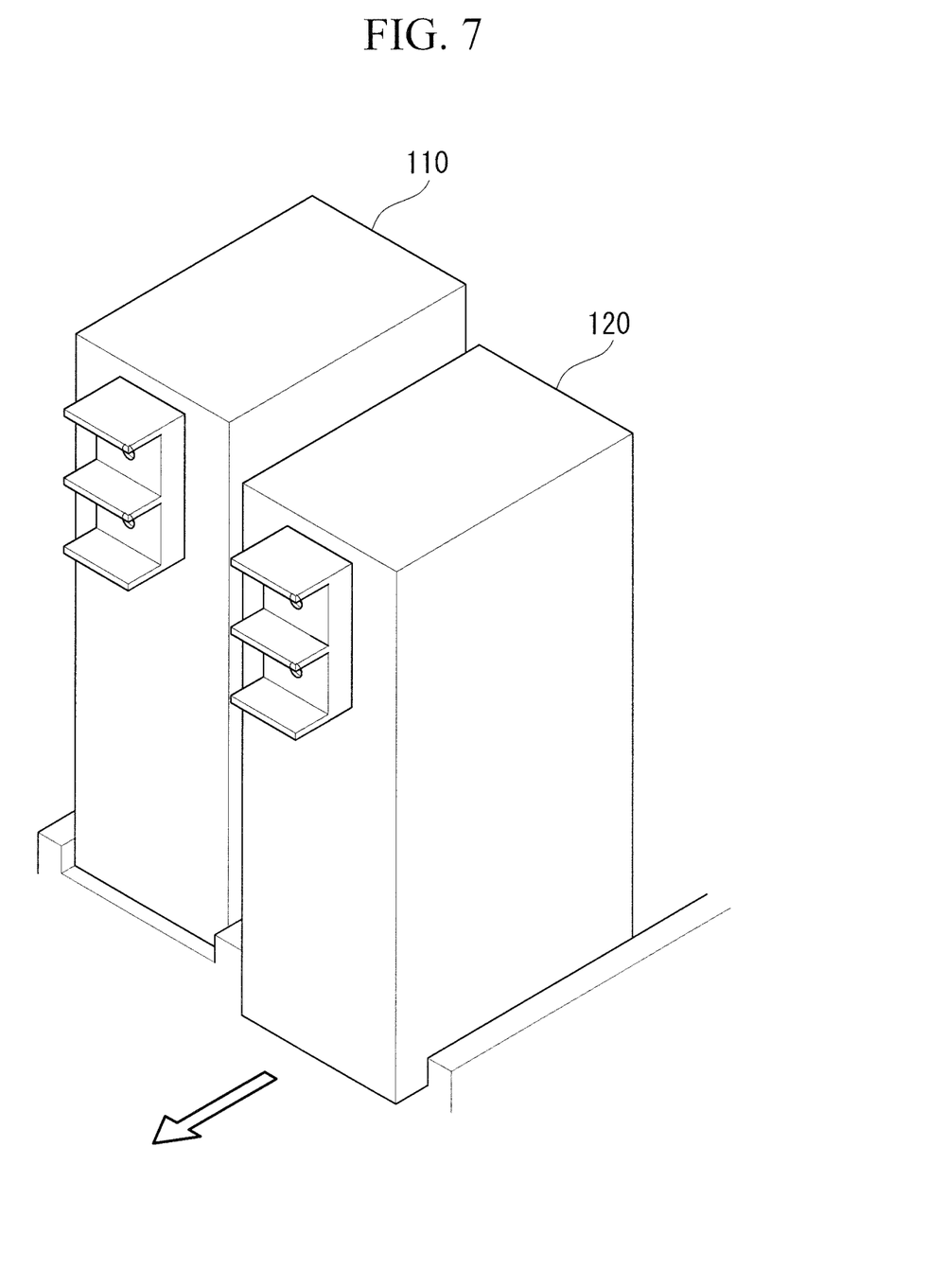
FIG. 7 is a diagram for explaining operation when replacing a second motor driving unit of the conventional motor drive device.

In the motor drive device shown in FIG. 6, the second motor driving unit 120 is replaced in accordance with, for example, a required specification with regard to a driven motor. At the time of replacement, for example, the second motor driving unit 120 is moved toward a front side and removed as illustrated in FIG. 7, and then another second motor driving unit 120 is inserted from the front side toward a back side.

At this stage, the pair of short bars 130 are removed from both of the first motor driving unit 110 and the second motor driving unit 120 because the pair of short bars 130 being placed on the front side of the second motor driving unit 120 would otherwise prevent the movement of the second motor driving unit 120 toward the front side. Since the pair of short bars 130 need to be removed from both of the first motor driving unit 110 and the second motor driving unit 120 when the second motor driving unit 120 is to be replaced, this removal work leads to a longer time necessary for the replacement of the second motor driving unit 120.

In the above-described bus bar including the plurality of grooves at the central part in the longitudinal direction, one end of the bus bar can be removed from the corresponding stud bolt by bending the bus bar at the central part while the other stud bolt is screwed with the nut. However, extra caution is required to prevent undesired plastic deformation that is highly likely to occur to the bus bar at the time of removal work. Moreover, when different motor drive units have different widths, a plurality of bus bars having different longitudinal lengths in accordance with the different widths need to be prepared, which leads to increase in manufacturing and maintenance work.

The above-described bus bar whose length is adjustable is not intended to achieve easy removal of the motor driving unit. Since the other bus bar is provided with the long hole extending in the longitudinal direction, a current allowable sectional area of the bus bar near the long hole is potentially insufficient for a desired current capacity, which causes heat generation, when the bus bar is used in a motor drive device unit or the like through which a large current flows.

The inventors have arrived at the following aspects of the present invention in order to make an improvement in the aforementioned circumstances.

A connection member according to a first aspect of the present invention includes: a first short bar whose one end is configured to be attached to a first terminal block; a second short bar which is extending in a longitudinal direction of the first short bar and whose one end is configured to be attached to a second terminal block, at least part of the other end side of the second short bar overlapping the first short bar in a direction orthogonal to the longitudinal direction; and a guide member which is attached to an overlapping part of the first short bar and the second short bar and which allows the second short bar to move relative to the first short bar in the longitudinal direction while maintaining surface contact between the first short bar and the second short bar at the overlapping part.

In this aspect, the first motor driving unit and the second motor driving unit are connected with each other by attaching the one end of the first short bar to the first terminal block with a part having a screw or the like, and moving the second short bar in a direction distant from the first short bar to extend the connection member and then attaching the one end of the second short bar to the second terminal block with a part having a screw or the like.

For example, when the second terminal block is fixed to a front surface of a motor driving unit for driving a motor and this motor driving unit is moved toward a front side for replacement, the one end of the second short bar is detached from the second terminal block, and the second short bar is moved toward the first short bar. In this way, when the second short bar is moved to a position where the second short bar does not overlap the motor driving unit in a front-back direction, the motor driving unit can be moved toward the front side and replaced without removing the connection member from the first terminal block.

In the above-described aspect, at least part of the guide member may elastically deform in a direction orthogonal to the longitudinal direction so that restoring force against the elastic deformation maintains the first short bar and the second short bar in contact with each other.

In this case, the restoring force against the elastic deformation of the guide member reliably maintains the first short bar and the second short bar in contact with each other.

In the above-described aspect, the guide member may be formed to cover edge parts of the first short bar and the second short bar or entire circumference of the first short bar and the second short bar.

A motor drive device according to a second aspect of the present invention includes a first motor driving unit and a second motor driving unit that are used for driving a motor and which are connected with each other through the connection member.

The aforementioned aspects can improve work efficiency when replacing a motor driving unit.

REFERENCE SIGNS LIST 1 power source
10 first motor driving unit
11 first terminal block
20 second motor driving unit
21 second terminal block
30 control unit
31 connection member
31a first short bar
31b second short bar
41 first housing portion
42 second housing portion
M motor

The invention claimed is:

1. A connection member comprising:
   a first short bar whose one end is configured to be attached to a first terminal block;
   a second short bar which extends in a longitudinal direction of the first short bar and whose one end is configured to be attached to a second terminal block, at least part of the other end side of the second short bar overlapping the first short bar in a direction orthogonal to the longitudinal direction; and
   a guide member which is attached to an overlapping part of the first short bar and the second short bar and which allows the second short bar to move relative to the first short bar in the longitudinal direction while maintaining surface contact between the first short bar and the second short bar at the overlapping part.

2. The connection member according to claim 1, wherein at least part of the guide member elastically deforms in a direction orthogonal to the longitudinal direction so that a restoring force against elastic deformation maintains the first short bar and the second short bar in contact with each other.

3. The connection member according to claim 1, wherein the guide member is formed to cover edge parts of the first short bar and the second short bar, or an entire circumference of the first short bar and the second short bar.

4. A motor drive device comprising a first motor driving unit and a second motor driving unit that are used for driving a motor and which are connected with each other through the connection member according to claim 1.

* * * * *